Sept. 22, 1970 — G. C. MASON — 3,529,939
CONTINUOUS RENDERING APPARATUS
Filed Feb. 23, 1966 — 3 Sheets-Sheet 1
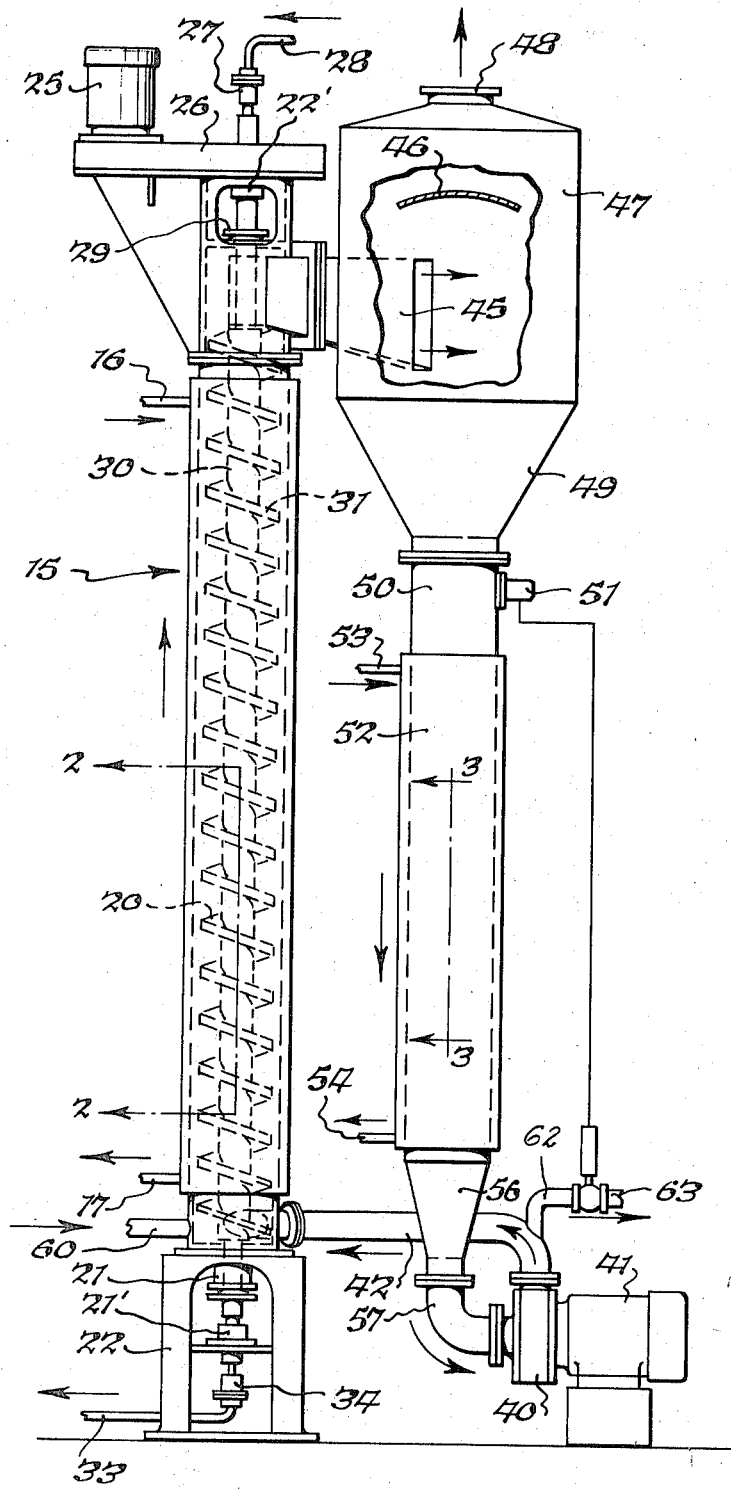
Fig. 1. Fig. 2. Fig. 3.
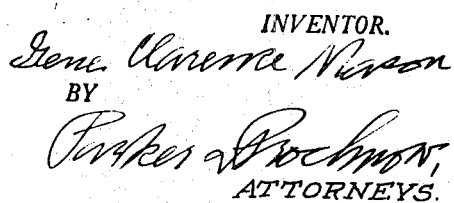

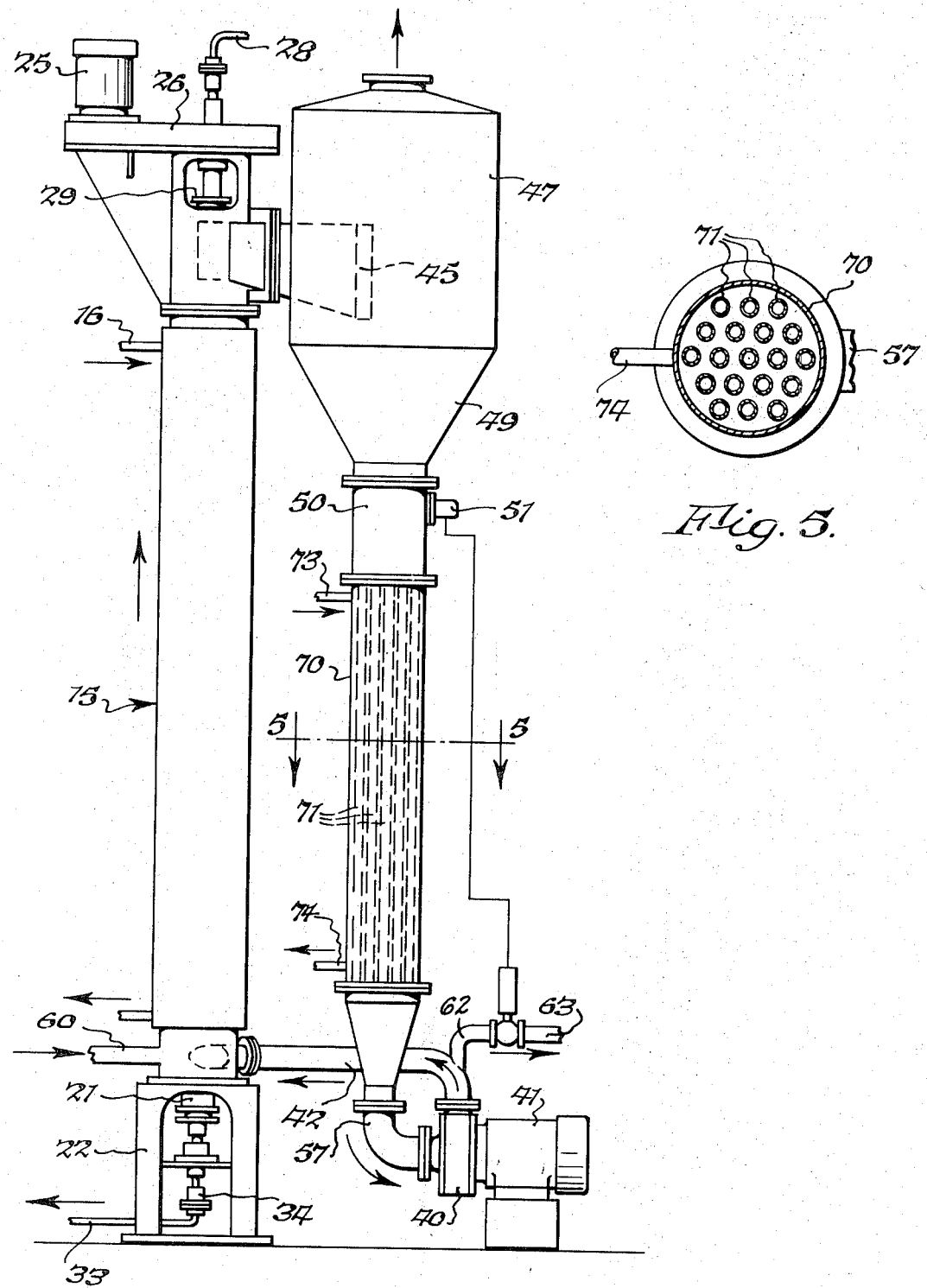

Sept. 22, 1970  G. C. MASON  3,529,939

CONTINUOUS RENDERING APPARATUS

Filed Feb. 23, 1966  3 Sheets-Sheet 3

INVENTOR.
Gene Clarence Mason
BY
Parker & Frochman
ATTORNEYS.

3,529,939
CONTINUOUS RENDERING APPARATUS
Gene Clarence Mason, Piqua, Ohio, assignor to The
French Oil Mill Machinery Company, Piqua, Ohio
Filed Feb. 23, 1966, Ser. No. 529,450
Int. Cl. A22c 17/00; B01d 43/00
U.S. Cl. 23—280                         9 Claims

ABSTRACT OF THE DISCLOSURE

Apparatus for rendering meat scraps and other material to cook and/or separate the water content from the such scraps or material to render the material so that the oils or fats contained therein are in condition to be more readily separated from the solids or fibrous material. For this purpose the apparatus includes a vertical evaporator with steam jacketed walls to which material is supplied to the lower part thereof and agitated therein, from which the material is discharged to an evaporator unit also having heating means passing through the same and from which the material is discharged at its lower end.

---

One of the objects of this invention is to provide apparatus of this type in which an evaporator unit of novel construction is provided with means for effecting more efficient cooking and better separation of the liquid and vapor phase.

Another object is to provide an apparatus of this type with a recirculating unit which receives the material after it has passed through the evaporator unit to subject the material to further treatment and which has a novel connection with the evaporator.

Another object is to provide apparatus of this kind which is efficient in operation and lower in cost per unit of material handled than apparatus of this general type heretofore provided.

In the accompanying drawings:

FIG. 1 is an elevation of a continuous rendering apparatus embodying this invention.

FIG. 2 is a fragmentary, sectional elevation thereof on line 2—2, FIG. 1.

FIG. 3 is a fragmentary, sectional elevation thereof on line 3—3, FIG. 1.

FIG. 4 is an elevation of an apparatus embodying this invention of slightly modified form.

FIG. 5 is a transverse sectional view on line 5—5, FIG. 4.

Figure 6:
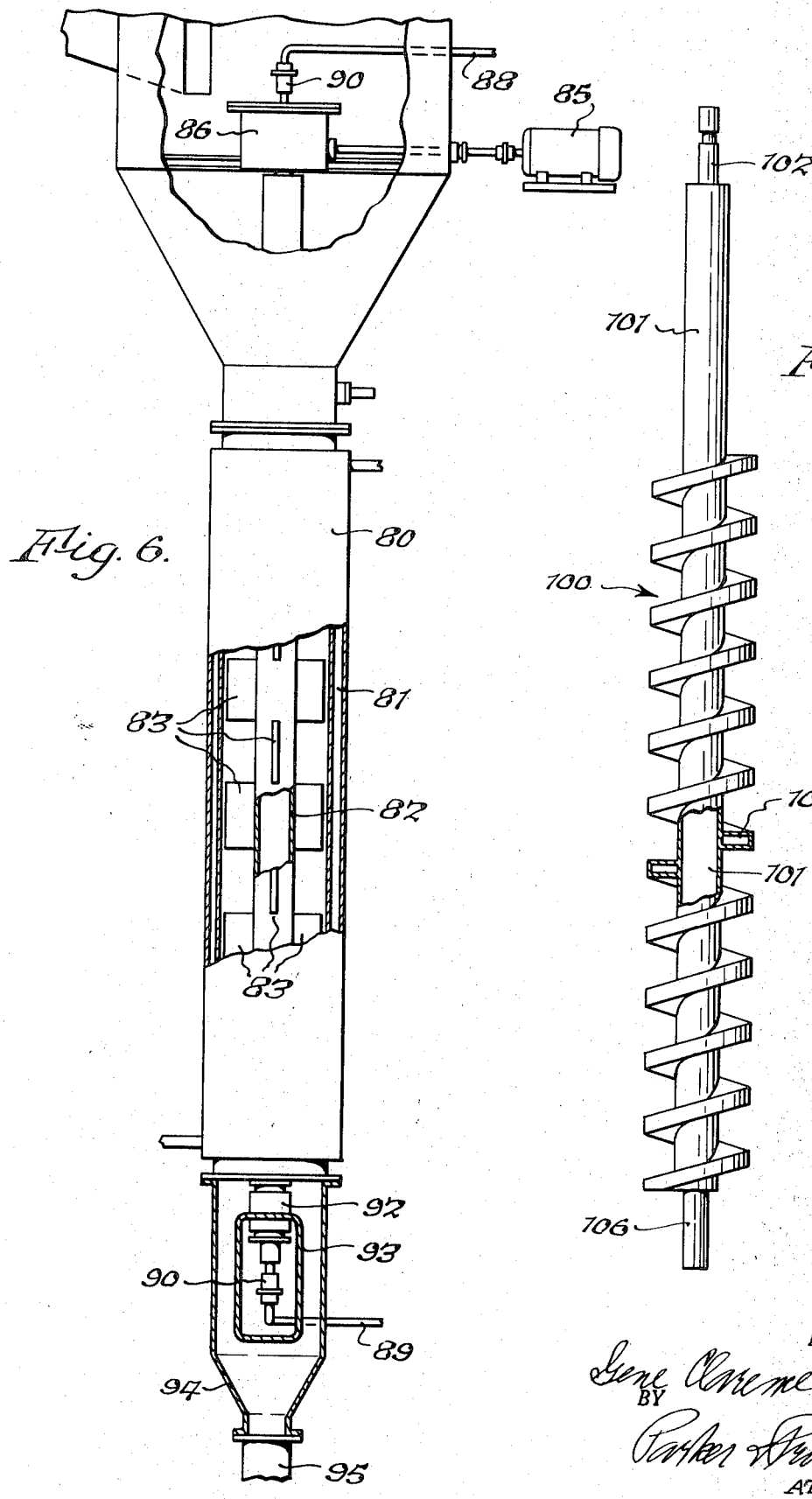
FIG. 6 is an elevation, partly in section, of a recirculating leg of another modified form.

The apparatus embodying my invention includes a vertical evaporator unit in the form of a cylindrical shell into the lower end of which the material to be treated is passed, and in this shell is a material-advancing device, such as a spiral screw conveyor which is rotated in a direction to move the material upwardly in contact with the shell, which is jacketed to permit the passage of a heating medium in the walls thereof. If desired, the advancing device itself may be of hollow construction to permit heating of the same by means of steam or other heating medium passing through the same.

The material is discharged from the upper end of the evaporator unit into an entrainment separator and may then be passed downwardly through a recirculating leg or passage from which it may be introduced into a pump which feeds some or all of this material to the lower end of the evaporator unit.

The evaporator unit includes a cylindrical housing or shell 15 which is double walled to provide a jacket into which steam or other heating medium may be admitted, for example, through an inlet pipe or duct 16 and from the lower end of which condensate is discharged through a conduit 17.

The advancing device in FIGS. 1–5 is in the form of a spiral screw or helical flight conveyor 20, the lower end of which is supported by a stabilizing bearing 21' and sealed with a packing unit 21 located on a base 22, and the upper end of which is supported by a thrust bearing 22' and sealed with a packing unit 29. This spiral conveyor or advancing device may be rotated in any suitable manner, for example, by means of a motor located in a housing 25 mounted on a gear casing 26 supported on the upper end of the shell or cylinder 15 of the evaporator unit.

Steam or other heating medium may be introduced into the interior of the spiral conveyor through the inlet pipe 28 leading down through a suitable rotary joint or similar device 27 to the upper end of the hollow shaft 30 of the advancing unit or spiral conveyor. The screw flights 31 of the conveyor are preferably hollow and consequently may receive steam or other heating medium in the same manner as applied to the shaft 30 from the inlet pipe 28. The condensate from the steam in the spiral conveyor is discharged from the apparatus through the pipe 33 which receives the condensate from the rotatable spiral conveyor through a rotary joint or similar device 34. Such rotary joints are well known to persons familiar with this art and a detailed disclosure thereof is not deemed necessary.

The material to be treated may be in the form of meat scrap or other renderable material ground to small particle size and is supplied into the lower end of the evaporator unit through line 60. The power for producing upward movement of the material in this shell is derived from three sources, such as the rotating helcoid or spiral conveyor; pump pressure applied by recirculating pump 40 driven by motor 41 discharging through a duct or conduit 42 to the lower end of the housing or shell 15 of the evaporator unit; boiling action of the liquid results in vaporization of that low boiling point fraction in the form of bubbles creating an upward movement of the mass. Under increased vacuum this action is increased.

The heat transfer from the housing or shell 15 and the jacketed spiral conveyor 31 vaporizes that fraction of the liquid having a low boiling point and the bubbles created produce an upward movement carrying liquid and solids.

The spiral conveyor running in close proximity with shell 15 creates a thin film condition and the localized agitation creates a high turbulence with a resulting high heat transfer coefficient. Additional high heat transfer is obtained from the surface of the flights due to the inherent slippage action in this type device, the slippage action creating an agitation with resulting high turbulence and high heat transfer coefficient. The recirculating pump assures positive movement of solids in the evaporator unit as result of high fluid velocities. The high fluid velocities create increased agitation and turbulence throughout the evaporator with resulting high heat transfer coefficients.

At the upper end of the evaporator unit the material is discharged into an entrainment separator or vapor body 47 having an entry 45 tangential to the periphery of the main body, causing a circular motion, which results in separation of the liquid-solid phase or droplets from the vapor phase. A deflector or baffle 46 may be employed just below the vapor outlet 48 to prevent entrained material from discharging with the vapor. The vapor may be drawn off either by an atmospheric or barometric condenser (not shown).

The liquid and/or liquid-solid phase discharges downward from housing 47 into a converging or funnel-shaped part 49 at the end of housing 47 and discharges into recirculating leg 50 which is preferably also arranged vertical. At the upper end of this leg 50 is provided a liquid level control device, a part of which is shown at 51. The level control may be either mechanical, pneumatic or electronic type, any of which is well known and available on the open market and therefore a description of the same is not included herein. It will be understood however that the level control serves to regulate the flow of finished material from the apparatus through the control of a discharge valve on line 63.

The recirculating leg 50 may also be provided with a jacket 52 if desired, for heating material moving downwardly in the recirculating leg unit, and into this jacket steam or other heating medium may be introduced through a pipe 53 and the condensate of the steam may be discharged through a pipe 54.

The leg 50 is provided at the lower end thereof with a discharge passage 56 connecting with a tube or pipe 57 leading to the inlet of the pump 40.

Material to be acted upon is introduced into the apparatus through an inlet pipe or duct 60 which connects to the lower end of the evaporator shell 15 and the treated material to be discharged from the apparatus passes thru a passage or pipe 62 connected with the tube or duct 42 controlled by the valve 63 which is actuated by the level control 51.

It will be obvious from the foregoing description of the apparatus that the raw material to be treated is fed to the lower end of the evaporator unit. This material thus introduced into the apparatus may be mixed with some of the material which has already been treated and which is discharged by the pump 40 through the duct 42. This material or mixture of materials is then acted on by the spiral conveyor and moved upwardly through the evaporator unit while being heated from the heat of the jacketed shell 15 and the heat from the jacketed screw conveyor.

The thoroughly heated product is then discharged at the upper end thereof to the entrainment separator 47 which separates the vapor generated in the material in the evaporator unit, from the liquid-solid material, and this vapor may be discharged either directly to the atmosphere or through a condenser. The remaining material, including the liquid fat or oil and solids then passes the level control and eventually into the recirculating leg by means of which further heat may be applied to the material, which is then discharged to the pump 40, and either discharged from the apparatus through a pipe 63, or back to the lower end of the evaporator unit. Additional fresh and/or raw material may be supplied through the pipe 60 to the material from the pump 40. The quantity of treated material in the apparatus is controlled by means of the level controller 51 at the top of the recirculating leg 50.

FIG. 4 shows a modification of my improved apparatus in which the material passing through a recirculating leg 70 is heated by a heating medium passing through a number of upright tubes 71 arranged within the shell of the recirculating leg 70. The steam or heating medium passes around the tubes 71 from an inlet pipe 73 and any condensate or residue is discharged from the shell through a discharge pipe 74. Otherwise the modified apparatus shown in FIG. 4 operates in a manner similar to that shown in FIGS. 1–3, and has similar numerals to identify similar parts.

In the modified construction shown in FIG. 6, I have provided the recirculating leg 80 which is preferably steam jacketed, as shown at 81, with an upright, tubular shaft 82 having plates or paddles 83 extending outwardly therefrom into close proximity to the interior wall of the shell 80. The shaft 82 and the paddles mounted thereon may be rotated within the shell of the recirculating leg in any suitable manner, for example, by means of a motor 85 driving suitable gears mounted in a housing 86 to rotate the shaft 82. The housing 86 also provides means by which steam or other heating medium may pass into the rotary shaft 82 from a pipe 88, and condensate is discharged at the lower end of the recirculating leg to a pipe 89 suitable glands 90 being provided which transmit the steam and condensate to or from the rotating shaft 82.

The shaft 82 may be provided at its lower end with a bearing and gland 92 resting on a frame member 93 supported in a discharge passage 94 through which the material from the recirculating leg passes to a discharge pipe or tube 95 which may be connected with the inlet of the pump 40 in any suitable manner.

Figure 7:
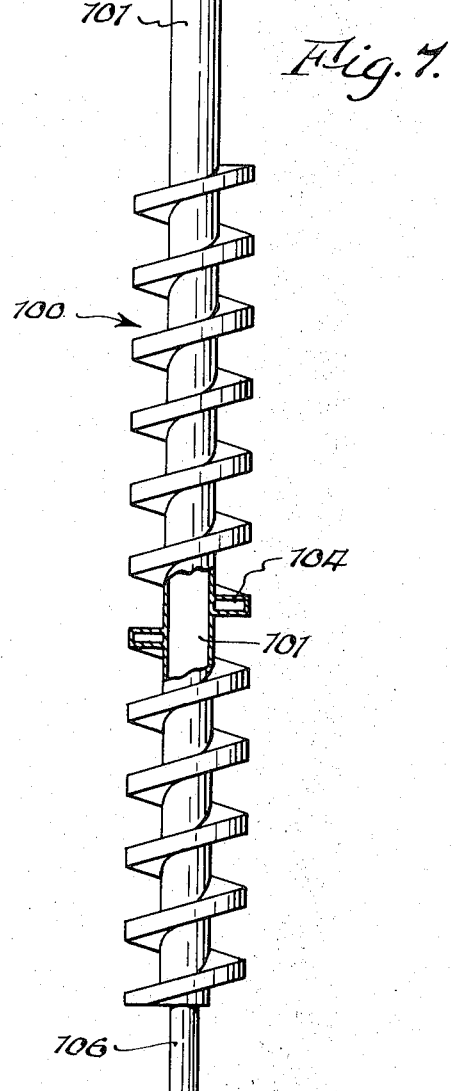
FIG. 7 is an elevation of a spiral conveyor such as may be used in the recirculating unit of apparatus of this kind.

The material in the recirculating leg shown in FIG. 6, may be agitated also by means of a spiral conveyor-like member 100, as shown in FIG. 7. This spiral member may be quite similar to the spiral member 30 shown in FIG. 1 and is provided with a hollow shaft 101, the upper end of which may fit into the housing 86, shown in FIG. 6, and receive steam or other heating medium in the upper end 102 thereof. The heating medium may be only in the tubular part 101 of this agitator, or if more heat is desired, the conveyor flights 104 may be made hollow to receive heating medium in the manner similar to that employed in connection with FIG. 1. Condensate resulting from the evaporation of steam in the agitating member shown in FIG. 7 may be from a discharge pipe 106 in the same manner indicated in FIG. 1.

It will be understood of course that if desired the helical agitator shown in FIG. 7 may have its flights 104 without steam jackets if such additional heat is not required and the agitators shown in FIGS. 6 and 7 may also be solid without carrying any heating medium, if such additional heat is not required.

It will be understood that various changes in the details, materials and arrangements of parts which have been herein described and illustrated in order to explain the nature of the invention may be made by those skilled in the art within the principle and scope of the invention as expresesd in the appended claims.

I claim:
1. A continuous rendering apparatus including:
   a vertically positioned eveaporator unit having steam jacketed walls,
   means for supplying material to be treated to the lower part of said evaporator unit,
   agitator means in said evaporator unit which agitate the material passing through the same into contact with the walls of said evaporator unit,
   means for rotating said agitator means,
   a recirculating unit comprising a housing,
   means for discharging material from the upper part of said evaporator unit to the upper end of the housing of said recirculating unit,
   said recirculating unit having means for heating material passing through the same,
   means at the lower end of said recirculating unit which discharges treated material from the apparatus,
   and a pump for injecting some treated material into the lower end of said evaporator to induce upward flow in said evaporator.

2. Apparatus according to claim 1 in which said recirculating unit is of upright tubular jacketed form, and means for supplying a heating medium to said jacketed recirculating unit.

3. Apparatus according to claim 1 and including means interposed between the upper end of said evaporator unit and said recirulating unit for removing vapor from the material, including a cylindrical chamber,
   said agitator means imparting circular motion to the material in said evaporator unit,
   and means for admitting material from said evaporator unit in a tangential direction into said cylindrical chamber.

4. A continuous rendering apparatus including:
an evaporator unit having substantially cylindrical steam jacketed walls and arranged in a vertical position,
an inlet for supplying material to be treated to the lower part of said evaporator unit,
agitator means in said evaporator unit which are in the form of a conveyor screw which agitates the material passing through said evaporator unit and urges the same upwardly,
means for rotating said conveyor screw,
a recirculating unit comprising an upright housing,
an entrainment separator interposed between the upper discharge end of said evaporator unit and the upper end of said recirculating unit for removing moisture from the material under treatment and depositing the remaining material into the upper end of said recirculating unit,
heating means in said recirculating unit for heating the material passing through the same, and
means at the lower end of said recirculating unit to discharge material therefrom,
and a pump receiving the discharged material and delivering a part of the same to the bottom of said evaporator unit.

5. Apparatus according to claim 4 including a discharge passage leading from said lower end of said recirculating unit for removal of finished material from the apparatus.

6. Apparatus according to claim 5 including:
a level control in said recirculating unit which is responsive to the level of material in said unit,
and a valve in said discharge passage which is controlled by said level control to keep the level of material in said apparatus substantially constant.

7. A continuous rendering apparatus including:
an evaporator unit having substantially cylindrical steam jacketed walls and arranged in a vertical position,
an inlet for supplying material to be treated to the lower part of said evaporator unit,
a recirculating unit comprising an upright housing,
means for discharging material from the upper portion of said evaporator unit to the upper portion of said recirculating unit,
a pump receiving treated material from the lower end of said recirculating unit and having a discharge duct connected with the lower part of said evaporator unit, said pump speeding the flow of material through said evaporator unit,
and means connected with said pump for removing from the apparatus material which has passed through said recirculating unit.

8. Apparatus according to claim 7 in which said material removing means are connected with said discharge duct for removing from the apparatus a part of the material passing through the same.

9. A continuous rendering apparatus including a vertically positioned evaporator unit of tubular form having steam jacketed walls,
an inlet for supplying material to be treated to the lower portion of said evaporator unit,
a screw conveyor within said evaporator unit which agitates the material in said evaporator unit and urges the same upwardly,
a recirculating unit of tubular form to the upper end of which material from said upper end of said evaporator unit is passed,
a connection between said recirculating unit and the inlet for discharging material from said recirculating unit to said evaporator.
a discharge duct leading to the lower portion of said evaporator unit,
and an outlet in said duct in advance of its connection with said evaporator unit for discharging some of the material from said apparatus.

References Cited

UNITED STATES PATENTS

| 3,263,748 | 8/1966 | Jemal et al. | 165—87 |
| 2,199,670 | 5/1940 | Lowry | 260—412.6 XR |
| 1,966,181 | 7/1934 | Lowry | 260—412.6 |
| 2,917,284 | 12/1959 | Christian | 165—87 |

JAMES H. TAYMAN, Jr., Primary Examiner

U.S. Cl. X.R.

23—290.5, 308; 159—27; 165—87, 107; 210—178, 179; 260—412.6